(12) United States Patent
Manabe et al.

(10) Patent No.: US 7,271,961 B2
(45) Date of Patent: Sep. 18, 2007

(54) CROSS DICHROIC PRISM AND PROJECTION DISPLAY APPARATUS EQUIPPED WITH CROSS DICHROIC PRISM

(75) Inventors: Yuji Manabe, Kamakura (JP); Kiyoshi Numazaki, Zama (JP); Hisao Oozeki, Kawagoe (JP); Tetsuo Hattori, deceased, late of Tokyo (JP); by Tomoko Hattori, legal representative, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/377,639

(22) Filed: Mar. 17, 2006

(65) Prior Publication Data
US 2006/0250584 A1    Nov. 9, 2006

Related U.S. Application Data

(63) Continuation of application No. PCT/JP2004/013138, filed on Sep. 9, 2004.

(30) Foreign Application Priority Data
Sep. 19, 2003 (JP) .............................. 2003-327203

(51) Int. Cl.
*G02B 27/14* (2006.01)

(52) U.S. Cl. ...................... 359/634; 359/606; 348/338; 353/33

(58) Field of Classification Search ................ 359/602, 359/605, 606, 634, 831; 348/336, 337, 338; 353/31, 33, 34, 82; 349/8
See application file for complete search history.

(56) References Cited

U.S. PATENT DOCUMENTS

| 2,737,076 | A | * | 3/1956 | Rock, Jr. ...................... 156/99 |
| 5,260,830 | A | * | 11/1993 | Nishida et al. ............. 359/634 |
| 5,946,056 | A | | 8/1999 | Ishibashi et al. |
| 6,342,971 | B1 | | 1/2002 | Hashizume et al. |

FOREIGN PATENT DOCUMENTS

| JP | A-10-311907 | 11/1998 |
| JP | A-10-311908 | 11/1998 |
| JP | A-10-311909 | 11/1998 |
| JP | A-2002-189109 | 7/2002 |
| JP | 2003-075614 | 3/2003 |

* cited by examiner

*Primary Examiner*—Hung Xuan Dang
*Assistant Examiner*—Joseph Martinez
(74) *Attorney, Agent, or Firm*—Morgan, Lewis & Bockius LLP

(57) ABSTRACT

A cross dichroic prism color-synthesizes a plurality of color lights having entered therein separately and emits color-synthesized light to a projection lens. The cross dichroic prism includes a first dichroic film; and a second dichroic film intersecting the first dichroic film so as to pass through the first dichroic film. The cross dichroic prism is configured so that a color light having entered the cross dichroic prism and having become diffracted at a gap created in the first dichroic film over an area where the second dichroic film passes through the first dichroic film is not projected through the projection lens.

14 Claims, 15 Drawing Sheets

US 7,271,961 B2

CROSS DICHROIC PRISM AND PROJECTION DISPLAY APPARATUS EQUIPPED WITH CROSS DICHROIC PRISM

This application is a continuation of International Application No. PCT/JP 2004/013138 filed Sep. 9, 2004.

INCORPORATION BY REFERENCE

The disclosures of the following priority applications are herein incorporated by reference:
Japanese Patent Application No. 2003-327203 filed Sep. 19, 2003
International Application No. PCT/JP 2004/013138 filed Sep. 9, 2004

BACKGROUND OF THE INVENTION

1. Field of the Invention

The present invention relates to a cross dichroic prism that color-synthesizes R (red) color light, G (green) color light and B (blue) color light having entered the prism separately and outputs color synthesized light. It also relates to a projection display apparatus that uses such a cross dichroic prism in color synthesis.

2. Description of Related Art

FIG. 11 is a plan view showing a structure adopted in a projection display apparatus in the related art and FIG. 12 is a sectional view showing a structure of a cross dichroic prism 109 utilized as a color synthesis optical system in the projection display apparatus.

Light emitted from a light source 101 enters a cross dichroic mirror 102. The cross dichroic mirror 102 includes a dichroic mirror 102B that reflects B (blue) light and a dichroic mirror 102RG that reflects R (red) light and G (green) light. The dichroic mirrors are disposed at right angles to each other. Thus, the light from the light source 101 is separated at the cross dichroic mirror 102 into B light and mixed light containing R light and G light advancing along directions opposite from each other.

The B light enters a deflecting mirror 103 where it changes its advancing direction to enter a B-light polarization beam splitter 106B. The B-light polarization beam splitter 106B reflects the B light having entered therein at its polarization splitter unit and the reflected B light is directed to enter a reflective light valve 107B for B light. The mixed light containing the R light and the G light enters a deflecting mirror 104 where it changes its advancing direction and the mixed light the n enters a G-light reflecting dichroic mirror 105. At the G-light reflecting dichroic mirror 105, the mixed light is separated into reflected G light and transmitted R light. The G light and the R light having undergone the color separation and having exited the G-light reflecting dichroic mirror 105 separately then enter polarization beam splitters 106G and 106R provided in correspondence to the respective colors of light. The G light and the R light having entered the respective polarization beam splitters 106G and 106R are reflected at polarization splitter units and the G light and the R light having exited the polarization beam splitters are directed to enter reflective light valves 107G and 107R for G color light and R color light, respectively.

The light beams corresponding to the individual colors having entered the B-color light reflective light valve 107B, the G-color light reflective light valve 107G and the R-color light reflective light valve 107R are modulated based upon color signals and mixed light beams containing modulated light and unmodulated light are reflected at the respective reflective light valves toward the polarization beam splitters 106B, 106G and 106R. After the mixed light beams, each containing the modulated light and the unmodulated light, enter the polarization beam splitters 106B, 106G and 106R respectively, the modulated light components alone are transmitted and extracted as analyzed light beams.

The analyzed light beams then enter a cross dichroic prism 109 through different incident surfaces. The cross dichroic prism 109 includes an R light reflecting dichroic film 109R and a B-light reflecting dichroic film 109B disposed therein at substantially right angles to each other. The R light and the B light having entered the cross dichroic prism 109 are reflected at the R light reflecting dichroic film 109R and the B-light reflecting dichroic film 109B respectively, whereas the G light having entered the cross dichroic prism 109 is transmitted through the dichroic films 109R and 109B. As a result, the R light, the B light and the G light become color synthesized at the cross dichroic prism 109 and they are emitted as synthesized light. The synthesized light having exited the cross dichroic prism 109 is projected via a projection lens 110 onto a screen (not shown) on which a projected image is formed.

FIG. 12 is a sectional view, showing the structure of the cross dichroic prism 109 constituting the color synthesis optical system. The method that may be adopted when manufacturing the cross dichroic prism 109 is first explained. Four right angle isosceles triangle prisms 109-1, 109-2, 109-3 and 109-4 having sectional shapes identical to one another are procured. B-light reflecting dichroic films 109B are formed at side surfaces of the prism 109-1 and the prism 109-3, each at one of the side surfaces forming the right-angle vertex of the corresponding prism. Next, the prism 109-1 and the prism 109-2 are bonded via an adhesive layer 109S so as to bond the surface of the prism 109-1 where the dichroic film has been formed to a side surface of the prism 109-2 and likewise, the prism 109-3 and the prism 109-4 are bonded via an adhesive layer 109S so as to bond the surface of the prism 109-3 where the dichroic film has been formed to a side surface of the prism 109-4. As a result, two prism pairs are formed.

Next, the hypotenuse surfaces facing opposite the right angle vertices of the two prism pairs are polished so as to achieve a desired level of flatness. Then, an R-color light reflecting dichroic film 109R is formed at the polished surface of the prism pair made up of the prisms 109-1 and 109-2, the surface at which the R-color light reflecting dichroic film 109R has been formed is bonded to the polished surface of the prism pair made up with the prism 109-3 and 109-4, and thus, the cross dichroic prism 109 is formed. The two prism pairs are bonded via an adhesive layer 109S by ensuring that the B-light reflecting dichroic films 109B formed at the two prism pairs are set so as to form a single flat surface.

In the cross dichroic prism 109 adopting the basic structure shown in FIG. 11, R light enters the prism 109-2, B light enters the prism 109-3 and G light enters the prism 109-4 and synthesized light exits through the prism 109-1, as shown in FIG. 12. Cross dichroic prisms adopting such a structure are disclosed in the following patent reference literatures.

Patent reference literature 1: Japanese Laid Open Patent Publication No. H10-311907
Patent reference literature 2: Japanese Laid Open Patent Publication No. H10-311908
Patent reference literature 3: Japanese Laid Open Patent Publication No. H10-311909

Patent reference literature 4: Japanese Laid Open Patent Publication No. 2002-189109

SUMMARY OF THE INVENTION

It has been learned that a G light ghost image attributable to structural characteristics of the cross dichroic prism described above manifests in the projection display apparatus in the related art.

The cross dichroic prism achieved in a first mode of the present invention, which color-synthesizes a plurality of color lights having entered the prism separately and emits the synthesized light to a projection lens, includes a first dichroic film and a second dichroic film intersecting the first dichroic film so as to pass through the first dichroic film and is configured so that a color light having entered the cross dichroic prism and having become diffracted at a gap created in the first dichroic film over the area where the second dichroic film passes through the first dichroic film is not projected through the projection lens.

It is to be noted that with $D(\mu m)$ representing the apparent distance over which the gap ranges when viewed from the direction of the optical axis of the projection lens, $\lambda(\mu m)$ representing the central wavelength of the color light diffracted at the gap and $\varnothing$ representing an angle that is half the opening angle defined by the numerical aperture NA of the projection lens, the distance D needs to satisfy the relationship expressed in (a) below to ensure that the color light is not projected via the projection lens.

$$(\lambda/D) \times ((\lambda/D)+2) > \sin 4\varnothing \qquad (a)$$

The cross dichroic prism achieved in a second mode of the present invention, which color-synthesizes a first color light, a second color light and a third color light having entered therein separately and emits synthesized light to a projection lens, includes a first dichroic film that reflects the first color light and allows the second color light and the third color light to be transmitted and a second dichroic film that intersects the first dichroic film so as to pass through the first dichroic film, reflects the second color light and allows the first color light and the third color light to be transmitted. The cross dichroic prism is configured so that the third color light diffracted at a gap created in the first dichroic film over the area where the second dichroic film passes through the first dichroic film is not projected via the projection lens.

The cross dichroic prism may be formed as a bonded assembly of first, second third and fourth right angle triangle prisms having right angle isosceles triangle sections by bonding the side surfaces of the prisms forming the right angles so as to abut the edges of the side surfaces forming the right angles at the triangle prisms. The first dichroic film and the second dichroic film may be formed over the areas where the first through fourth right-angle prisms are bonded so that they intersect each other over the area where the edges are abutted.

The bonded assembly may include a first bonded prism formed by sequentially forming the first dichroic film and a first adhesive layer at one of the side surfaces of the first right-angle prism ranging perpendicular to each other and bonding the second right-angle prism to the side surface of the first right-angle prism and a second bonded prism formed by sequentially forming the first dichroic film and a first adhesive layer at one of the side surfaces of the third right-angle prism ranging perpendicular to each other and bonding the fourth right-angle prism to the side surface of the third right-angle prism. In such a bonded assembly, the individual prisms may be bonded so that the first right-angle prism and the third right-angle prism lie adjacent to each other and that the second right-angle prism and the fourth right-angle prism lie adjacent to each other, with the second dichroic film formed at the surface of the first bonded prism where it is bonded with the second bonded prism and a second adhesive layer formed for purposes of bonding between the second dichroic film and the second bonded prism.

In addition, with $D(\mu m)$ representing the apparent distance over which the gap ranges when viewed from the direction of the optical axis of the projection lens, $\lambda(\mu m)$ representing the central wavelength of the third color light diffracted at the gap and $\varnothing$ representing an angle that is half the opening angle defined by the numerical aperture NA of the projection lens, the distance D should satisfy the relationship expressed in (b) below.

$$(\lambda/D) \times ((\lambda/D)+2) > \sin 4\varnothing \qquad (b)$$

Furthermore, the first bonded prism and the second bonded-prism should be bonded by ensuring that the first dichroic film formed at the first right-angle prism and the first dichroic film formed at the third right-angle prism form a single flat surface. In this case, it is desirable that with $t2(\mu m)$ representing the film thickness of the first dichroic film, $t1(\mu m)$ representing the film thickness of the second dichroic film, $s1(\mu m)$ representing the thickness of the second adhesive layer, $\lambda(\mu m)$ representing the central wavelength of the third color light diffracted at the gap and $\varnothing$ representing an angle that is half the opening angle defined by the numerical aperture NA of the projection lens, the thickness ($s1+t1$) should be set so as to allow the apparent distance D over which the gap ranges when viewed from the direction of the optical axis of the projection lens, expressed as $D=(s1+t1-t2)/\sqrt{2}$, to satisfy the relationship expressed in (c) below.

$$(\lambda/D) \times ((\lambda/D)+2) > \sin 4\varnothing \qquad (c)$$

Alternatively, the bonded assembly may include a first bonded prism formed by sequentially forming the first dichroic film and a first adhesive layer at one of the side surfaces of the first right-angle prism ranging perpendicular to each other and bonding the second right-angle prism to the side surface of the first right-angle prism and a second bonded prism formed by sequentially forming the first dichroic film and a first adhesive layer at one of the side surfaces of the fourth right-angle prism ranging perpendicular to each other and bonding the third right-angle prism to the side surface of the fourth right-angle prism. In such a bonded assembly, the individual prisms may be bonded so that the first right-angle prism and the third right-angle prism lie adjacent to each other and that the second right-angle prism and the fourth right-angle prism lie adjacent to each other, with the second dichroic film formed at the surface of the first bonded prism where it is bonded with the second bonded prism and a second adhesive layer formed for purposes of bonding between the second dichroic film and the second bonded prism.

The first bonded prism and the second bonded prism may be bonded to each other so as to create a stage $Z(\mu m)$ between the first dichroic film at the first bonded prism and the first dichroic film at the second bonded prism. In this case, it is desirable that with $t2(\mu m)$ representing the film thickness of the first dichroic film, $t1(\mu m)$ representing the film thickness of the second dichroic film, $s1(\mu m)$ representing the thickness of the second adhesive layer, $\lambda(\mu m)$ representing the central wavelength of the third color light diffracted at the gap and $\varnothing$ representing an angle that is half the opening angle defined by the numerical aperture NA of the projection lens, the thickness (s1−Z) should be set so as to allow the apparent distance D, over which the gap ranges when viewed from the direction of the optical axis of the projection lens, expressed as D=(t1−t2+s1−Z)/√2 to satisfy the relationship expressed as in (d) below.

$$(\lambda/D) \times ((\lambda/D)+2) > \sin 4\varnothing \qquad (d)$$

Furthermore, the first color light, the second color light and the third color light may be emitted from light valves assuming a pixel pitch P(μm) and in this case, the stage Z(μm) may satisfy the relationship expressed in (e) below.

$$Z\sqrt{2} < \tfrac{1}{2} P \qquad (e)$$

It is desirable that the film thickness of the second dichroic film be smaller than the film thickness of the first dichroic film.

The projection display apparatus according to the present invention includes a color separation optical system that separates light from a light source into a first color light, a second color light and a third color light, light valves disposed each in correspondence to the light in a specific color, the cross dichroic prism described above and a projection lens that projects light resulting from color synthesis achieved at the cross dichroic prism.

By using the cross dichroic prism and the projection display apparatus according to the present invention, an occurrence of ghost image is prevented and thus, a superior projected image can be achieved.

DESCRIPTION OF PREFERRED EMBODIMENTS

An embodiment of the present invention is configured to prevent an occurrence of a ghost image attributable to structural characteristics of a cross dichroic prism.

First, the cause of ghost image attributable to the structural characteristics of the cross dichroic prism in the related art described earlier is examined.

Figure 12:
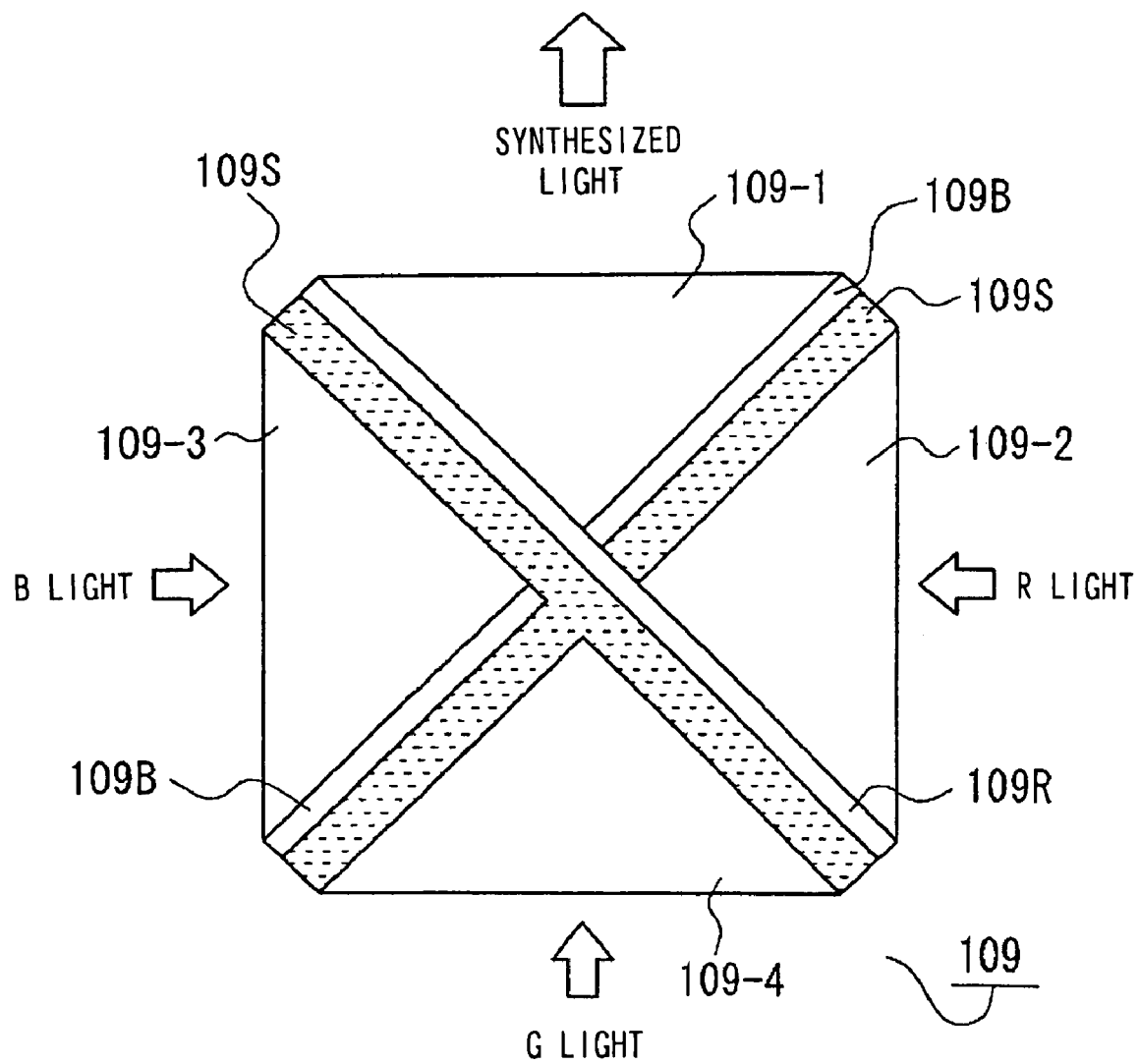
FIG. 12 is a sectional view showing the structure of a cross dichroic prism in the related art.
Figure 13:
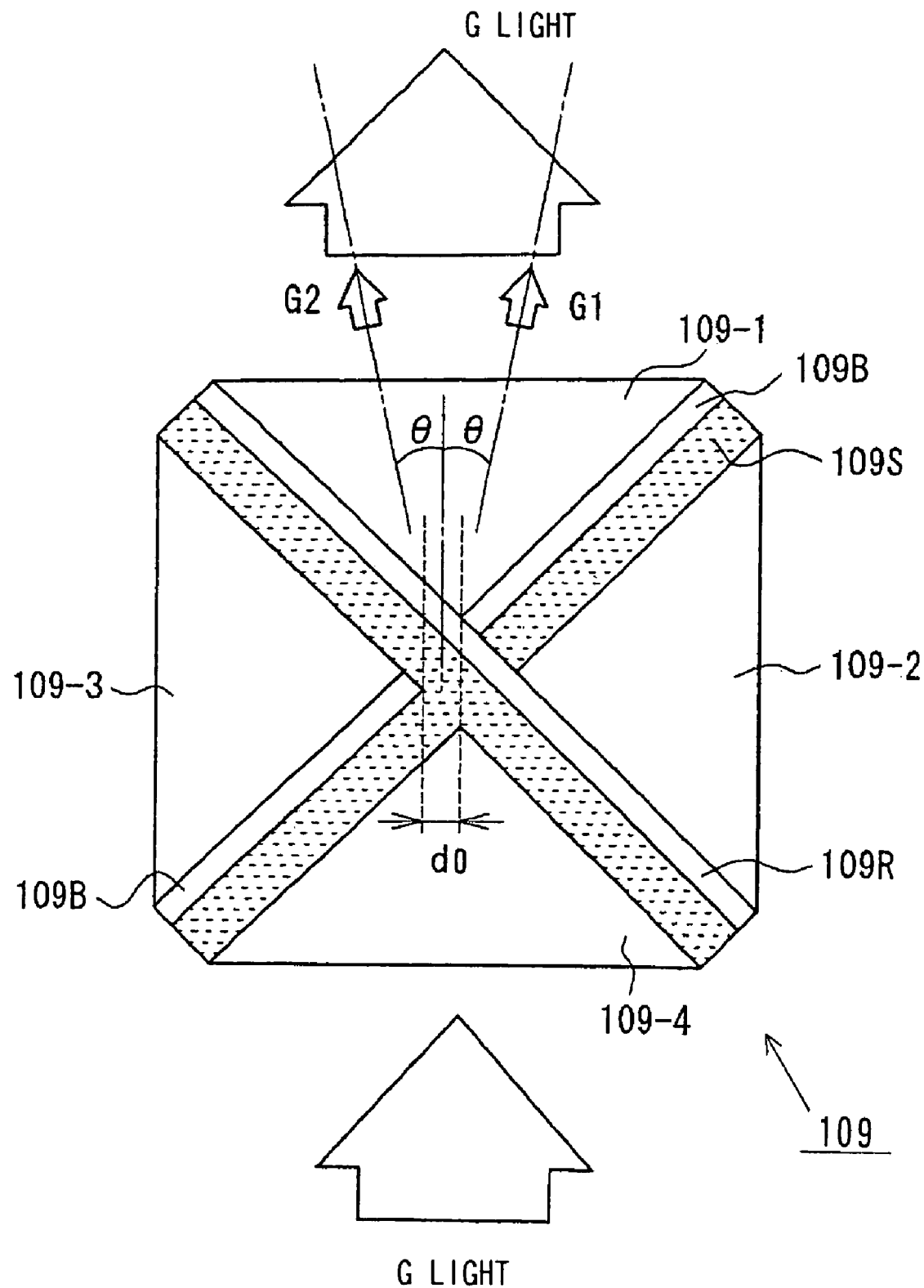
FIG. 13 illustrates a cause of ghost image originating in the cross dichroic prism in the related art.

FIG. 13 illustrates how the G light having entered the cross dichroic prism 109 in the related art shown in FIG. 12 may exit the cross dichroic prism 109 as ghost light beams G1 and G2. As explained earlier, the G light having entered the cross dichroic prism 109 through the incident surface of the triangle prism 109-4 is directly transmitted through the cross dichroic prism 109 and exits the cross dichroic prism 109 through the exit surface of the triangle prism 109-1 under ideal circumstances.

As shown in the figure, while the R-light reflecting dichroic film 109R ranges continuously over the central area of the cross dichroic prism 109, the B-light reflecting dichroic film 109B is interrupted over a gap ranging over a distance d0. The distance d0 in this context is defined as the distance between two planes (indicated by the dotted lines) ranging parallel to the optical axis of the G light (which is also the optical axis of the projection lens 110) and perpendicular to the surface of the drawing sheet. Namely, the distance d0 indicates the apparent distance over which the gap in the B-light reflecting dichroic film 109B ranges when viewed from the direction of the optical axis of the projection lens.

While the B-light reflecting dichroic film 109B achieves optical characteristics that substantially allow G light to be transmitted, its transmittance factor is not exactly 1. For this reason, the G light travels through the slit where the transmittance factor is 1, formed in the B-light reflecting dichroic film 109B where the transmittance factor is other than 1, with the slit ranging over the distance d0 and extending along the direction perpendicular to the drawing sheet surface. As the light passes through the slit ranging over a specific distance, the light becomes diffracted on the two sides of the optical axis of the incident light with an angle of inclination θ. It has been learned that the projected image contains this diffracted light manifesting as the ghost light mentioned earlier.

Figure 14:
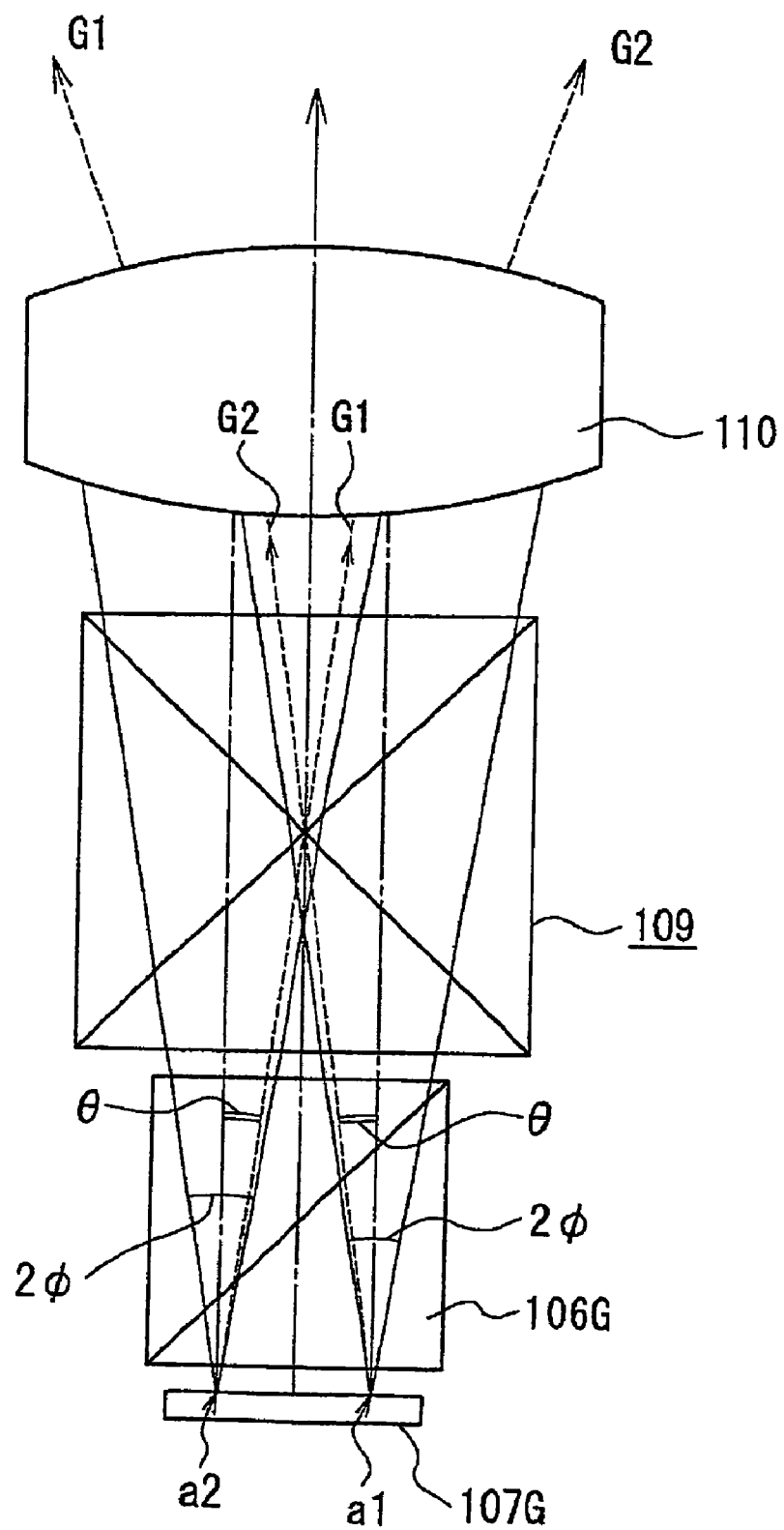
FIG. 14 illustrates how the ghost image originating in the cross dichroic prism in the related art is projected.

FIG. 14 illustrates how the ghost light beams G1 and G2 are projected. The projection lens 110 has a numerical aperture NA, and as light fluxes assuming a circular cone shape with a vertex angle 2∅ corresponding to the NA value at the projection lens 110 enter the projection lens 110 from various points at the image forming surface of the light valve 107G, the light fluxes are projected as a projected image. The angle ∅ indicates the angle formed relative to an axis running parallel to the optical axis.

Assuming that the ghost light beams G1 and G2 are beams having exited the light valve 107G from points a1 and a2 on the light valve 107G, these ghost light beams are contained in the circular cone-shaped light fluxes defined in correspondence to the NA and thus, the ghost light beams G1 and G2 are projected via the projection lens 110. This explanation relates to ghost images caused by light beams entering the central area of the cross dichroic prism 109 along the direction parallel to the optical axis.

Figure 15:
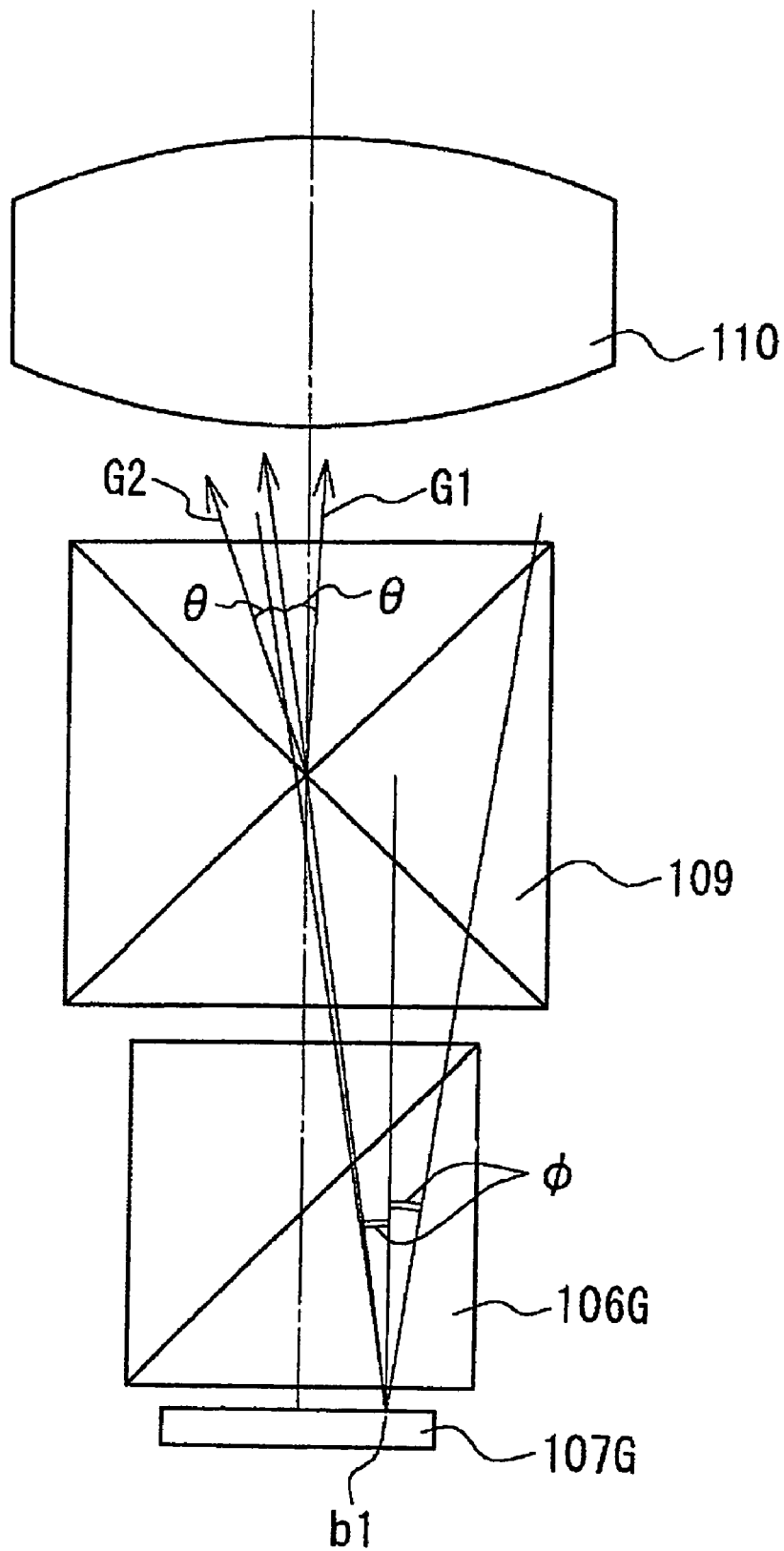
FIG. 15 illustrates how the ghost image originating in the cross dichroic prism in the related art is projected.

As shown in FIG. 15, a light beam near the outer edge in the circular cone-shaped light flux with the vertex angle 2Ø exiting the light valve 107G at a point b1 enters the cross dichroic prism 109 at its central area. As a result, diffracted light beams G1 and G2 manifest on the two sides of the light beam having entered the central area each with the angle θ relative to the light beam having entered the central area. In this case, the inclination of the diffracted light beam G2 is greater than the inclination of the light beam at the outer edge of the circular cone-shaped light flux with the vertex angle corresponding to the NA at the projection lens. Thus, even if it enters the projection lens 110, it is clipped by an aperture stop at the projection lens 110 and is not projected as ghost light. However, the diffracted light G1 is contained in the circular cone-shaped light flux corresponding to the NA and is projected as ghost light.

FIRST EMBODIMENT

Figure 1:
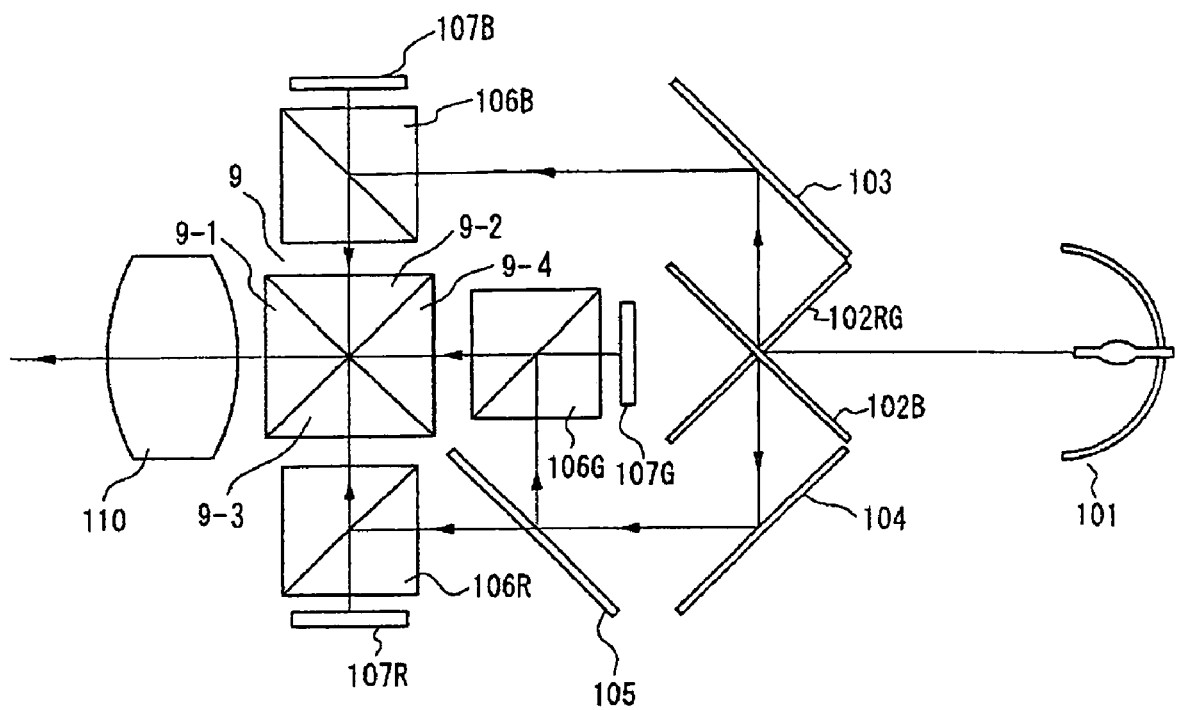
FIG. 1 is a plan view showing a basic structure adopted in a projection display apparatus according to the present invention.
Figure 2:
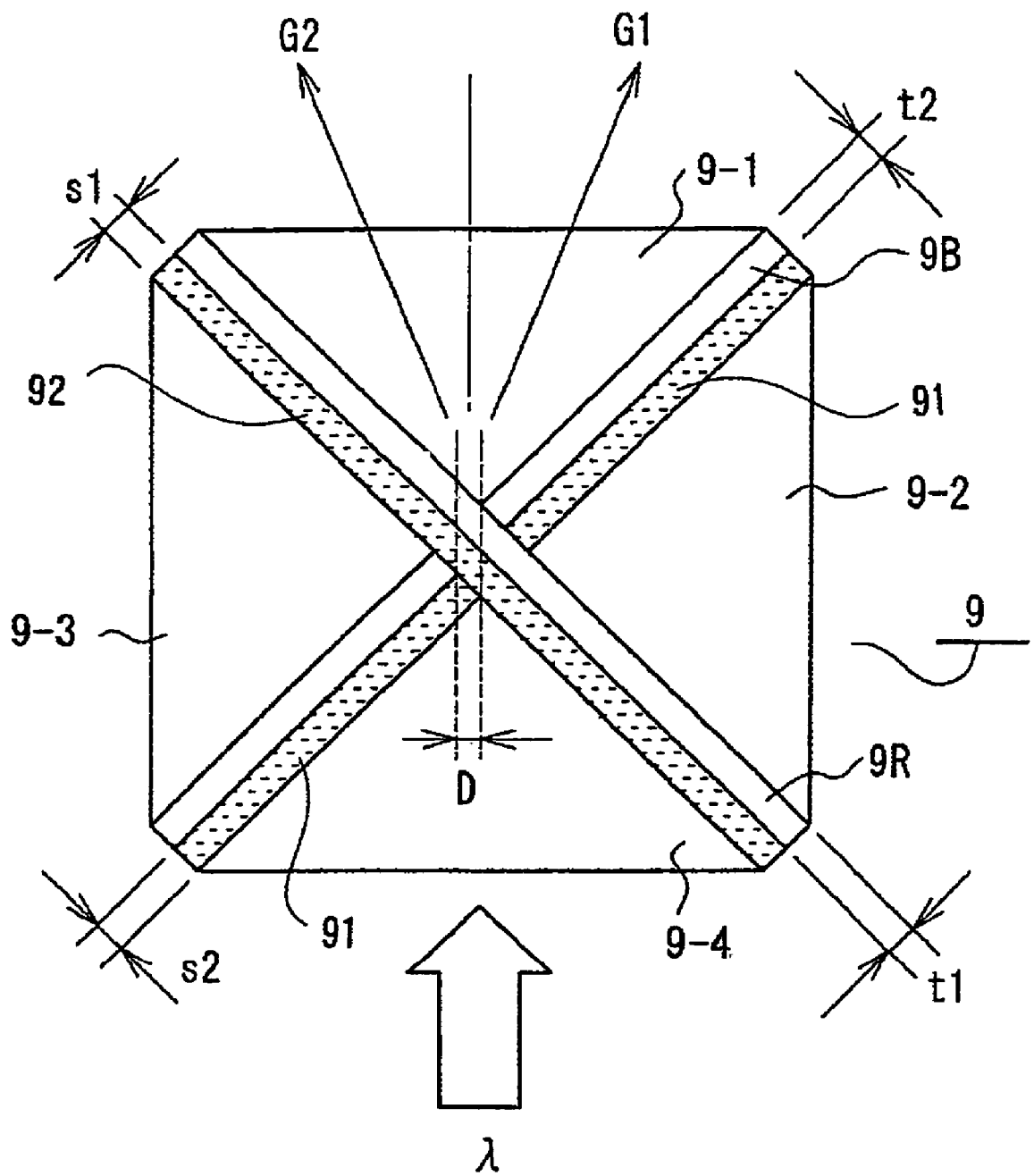
FIG. 2 is a sectional view of a structure adopted in a cross dichroic prism achieved in a first embodiment of the present invention.

Next, a cross dichroic prism according to the present invention and a projection display apparatus equipped with the cross dichroic prism are explained. FIG. 1 is a plan view showing the structure of a projection display apparatus in which a cross dichroic prism 9 according to the present invention is utilized as a color synthesis optical system. FIG. 2 is a sectional view of the cross dichroic prism 9. The structure of the projection display apparatus in FIG. 1 is similar to that of the projection display apparatus in the related art except for the cross dichroic prism 9, and the same reference numerals are assigned to identical components to preclude the necessity for a repeated explanation thereof.

As shown in FIG. 2, the cross dichroic prism 9 includes four right angle isosceles triangle prisms 9-1, 9-2, 9-3 and 9-4 with sectional shapes thereof identical to one another, which are bonded by abutting the edges of the side surfaces ranging perpendicular to one another at the individual triangle prisms. A B-light reflecting dichroic film 9B with a thickness t2 is formed at side surfaces of the prisms 9-1 and 9-3. At each of these prisms the B-light reflecting film 9B is formed over a layer thickness t2 at one of the side surfaces forming a right angle. Then, a prism pair is formed by bonding one of the side surfaces of the prism 9-2 forming a right angle to the surface of the prism 9-1 at which the dichroic film 9B has been formed. At this time, the prisms 9-1 and 9-2 are bonded by ensuring that the side surfaces of the prisms 9-1 and 9-2, which are not to be bonded, are set so as to form a single flat surface. Likewise, a prism pair is formed by bonding one of the side surfaces of the prism 9-4 forming a right angle to the surface of the prism 9-3 at which the dichroic film 9B has been formed. The prism pairs are each formed by bonding the prisms via an adhesive layer 91 with a thickness s2 smaller than the thickness of the adhesive layer used in the related art.

Next, an R light reflecting dichroic film 9R with a thickness t1 is formed over the flat surface constituted with the unbonded side surfaces of the prisms 9-1 and 9-2 making up the prism pair. Then, the cross dichroic prism 9 is formed by bonding via an adhesive layer 92 the flat surface at which the R light reflecting dichroic film 9R has been formed with the flat surface made up of the side surfaces of the prisms 9-3 and 9-4 of the other prism pair so that the B-light reflecting dichroic film 9B formed at one prism pair and the B-light reflecting dichroic film formed at the other prism-pair form a single flat surface. A thickness s1 of the adhesive layer 92 is set smaller than the thickness of the adhesive layer used in the related art.

In the projection display apparatus shown in FIG. 1, G light having exited the light valve 107G and having been analyzed and extracted through a polarization beam splitter 106G enters the prism 9-4. D in FIG. 2 indicates the distance over which the gap present between the pair of B-light reflecting dichroic film areas 9B ranges, matching the distance between a pair of planes each in contact with the front end of one of the B-light reflecting dichroic film areas 9B and extending parallel to the optical axis of the G light and perpendicular to the drawing sheet surface. Namely, D represents the apparent distance over which the gap extends when viewed from the direction of the optical axis of the G light which is equivalent to the optical axis of the projection lens 110. It is crucial that D assumes a value smaller than the corresponding distance d0 in the related art. The value of D is now explained in detail.

Assuming that light with a wavelength λ has entered the B-light reflecting dichroic film 9B set discontinuous over the distance D defined as described above, an angle of diffraction θ of the positive and negative first-order diffracted light beams (G1 and G2) resulting from the diffraction of the G light at the gap ranging over the distance D satisfies a relationship expressed as in (1) below. It is to be noted that the angle of diffraction θ indicates the angle relative to an axis parallel to the optical axis of the G light.

$$\sin 2\theta = (\lambda/D) \times ((\lambda/D)+2) \tag{1}$$

Next, an explanation is given on how expression (1) can be obtained. An exiting angle θm of the positive and negative first-order diffracted light resulting from the diffraction of light with a wavelength λ having entered the slit with a width d with an angle of incidence θi can be expressed as in (1-1) under normal circumstances.

$$\sin \theta m - \sin \theta i = \pm \lambda/d \tag{1-1}$$

With α representing the angle of the diffracted light relative to the optical axis of the incoming G light, the following expression (1-2) is true.

$$\theta m = \alpha + \theta i \tag{1-2}$$

Since θi=45° in the cross dichroic prism 9, sin θm=sin (α+θi)=sin α cos θi+cos α sin θi=(sin α+cos α)/√2 is true. By using the above expression for substitution in expression (1-1), the following expression (1-3) is obtained.

$$(\sin \alpha + \cos \alpha)/\sqrt{2} - 1/\sqrt{2} = \pm \lambda/d \tag{1-3}$$

Since the relationship expressed as D'=d/√2 is true with regard to the apparent distance D' over which the slit with the width d ranges when viewed from the direction along the angle of incidence of 45°, i.e., the apparent distance D' over which the slit ranges when viewed from the direction of the optical axis of the projection lens 110, expression (1-3) can be rewritten as an expression related to the distance D' based upon this relationship. When this concept is adopted, in relation to the B-light reflecting dichroic film 9B of the cross dichroic prism 9, the apparent distance D over which the gap in the B-light reflecting dichroic film 9B ranges corresponds to D', and the following expression (1-4) is obtained by substituting D√2 for d in expression (1-3).

$$\sin \alpha + \cos \alpha - 1 = \pm \lambda/D$$

$$\sin \alpha + \cos \alpha = (\pm \lambda/D)+1 \tag{1-4}$$

Expression (1-4) can be modified by squaring the two sides thereof to;

$$2 \sin \alpha \cos \alpha = (\lambda/D) \times ((\lambda/D) \pm 2)$$

Since $\alpha$ is defined as $\theta$ in the embodiment, the following expression (1-5) indicates a relationship identical to that expressed in (1)

$$\sin 2\alpha = (\lambda/D) \times ((\lambda/D) \pm 2) \qquad (1\text{-}5)$$

Assuming that a light beam having exited the light valve 107G through its surface at a given point becomes the two diffracted light beams G1 and G2, i.e., the positive first order diffracted light beam and the negative first-order diffracted light beam, the relationship expressed in (2) below is true with regard to the angle (2Ø) at the vertex of the circular cone-shaped light flux exiting the exit point and projected as a projected image via the projection lens 110, the numerical aperture NA at the projection lens 110 and the F value F at the projection lens 110.

$$\sin \emptyset = NA = 1/(2F) \qquad (2)$$

This relationship is true since an aperture stop (not shown) disposed in the projection lens 110 determines the numerical aperture NA and a beam advancing with an angle greater than the vertex angle (2Ø) is clipped by the aperture stop.

Assuming that an inclined light beam at the outer edge of the circular cone-shape defining the NA in FIG. 15 enters the central area of the cross dichroic prism 9, resulting in a manifestation of diffracted light beams on the two sides of the light beam with an angle $\theta$ relative to the light beam, the following conclusion can be drawn. Namely, in order to ensure that the diffracted light beams G1 and G2 having entered the projection lens 110 are not projected, the diffracted light beams G1 and G2 need to have greater inclination than that of the circular cone shape defining the NA so that they are clipped at the aperture stop. This means that the angle of diffraction $\theta$ in FIG. 15 needs to be equal to or greater than double the vertex angle, as indicated in (3) below.

$$\theta > 2\emptyset \qquad (3)$$

Expression (3) can be modified to expression (4) by multiplying the two sides in expression (3) by 2 and then taking sines in the two sides.

$$\sin 2\theta = (\lambda/D) \times ((\lambda/D) + 2) > \sin 4\emptyset \qquad (4)$$

Expression (4) indicates that D needs to satisfy the relationship expressed in (5) below if it is to be ensured that the ghost light beams G1 and G2 are not projected via the projection lens 110.

$$(\lambda/D) \times ((\lambda/D) + 2) > \sin 4\emptyset \qquad (5)$$

Assuming that the F value at the projection lens 110 is 2.8 and also that $\lambda$, i.e., the central wavelength of the G light, is 0.55 µm (550 nm), Ø is calculated to be 10.287° by using expression (2). These values are then used for substitution in expression (5) to lead to the following inequality $$D < 1.9 \text{ µm}.$$

Figure 3:
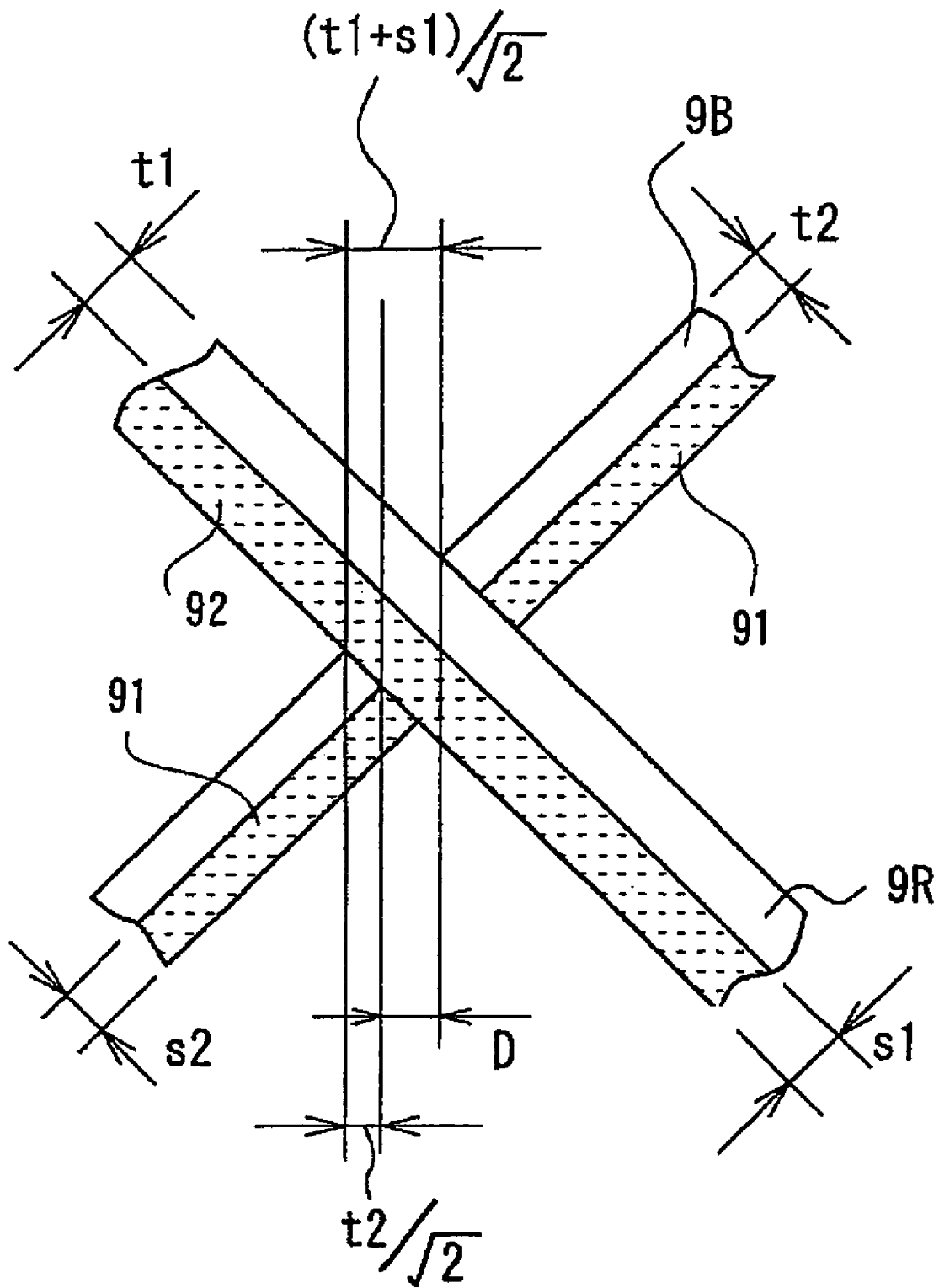
FIG. 3 is an enlarged view showing the structure adopted in the central area of the cross dichroic prism achieved in the first embodiment of the present invention.

Next, an explanation is given on the thickness s1 to be assumed for the adhesive layer 92. FIG. 3 is an enlargement of the structure in the central area of the cross dichroic prism 9 in FIG. 2. As FIG. 3 indicates, the value for D can be determined as expressed in (6) below. In expression (6), t1 represents the film thickness of the R light reflecting dichroic film 9R, t2 represents the film thickness of the B-light reflecting dichroic film 9B and s1 represents the thickness of the adhesive layer 92.

$$D = (s1 + t1 - t2)/\sqrt{2} \qquad (6)$$

For instance, when the film thicknesses t1, t2 of the R light reflecting dichroic film 9R and the B-light reflecting dichroic film 9B are substantially equal to each other, the following restriction can be set with regard to the value of s1 by applying the inequality related to D above in expression (6).

$$s1 < 2.7 \text{ µm}$$

By setting a value smaller than a specific value for the thickness s1 of the adhesive layer 92 as indicated above, it is ensured-that D assumes a small value. By setting a small value for D, in turn, the angle of diffraction of the light that becomes diffracted when it passes through the slit ranging over the distance D can be set greater than NA defined by the aperture at the projection lens 110 and thus, the occurrence of ghost images attributable to the diffracted light can be prevented. It is obvious that by further reducing the thickness s1 of the adhesive layer 92, the angle of diffraction of the light that becomes diffracted as it passes through the slit ranging over the distance D can be further increased so that the diffracted light does not enter the projection lens 110 at all. Such an adhesive layer 92 may be achieved by, for instance, reducing the viscosity of the adhesive or by applying a significant pressure to the two members to be bonded during the bonding process.

It is to be noted that as expression (6) indicates, the value of t2 should be greater than the value of t1 in order to assume a small value for D. Namely, it has been learned that D is allowed to assume a smaller value by setting a greater film thickness for the film with a gap formed at the center thereof relative to the film thickness of the other continuous film.

In a projection display apparatus equipped with the cross dichroic prism 9 satisfying the requirements described above to function as a color synthesis optical system, diffracted light from the gap in the B-light reflecting dichroic film 9B at the center of the cross dichroic prism 9 is clipped at the aperture stop in the projection lens 110 as it enters the lens and thus, the diffracted light is not projected as a projected image. In addition, by further increasing the angle of diffraction of the diffracted light, even the entry of the diffracted light at the projection lens 110 itself can be disallowed, and in such a case, a highly desirable image can be projected.

SECOND EMBODIMENT

The apparent distance D over which the gap in the B-light reflecting dichroic film 9B ranges is reduced in the cross dichroic prism 9 in the first embodiment by setting the layer thickness s1 of the adhesive layer 92 to a smaller value. As a result, the angle of diffraction of the ghost light attributable to the diffracted light generated at the gap is increased so that even if the ghost light enters the projection lens, it is not projected through the projection display apparatus. In the second embodiment, the distance D is made to assume a small value by forming a stage on the front side and the rear side of the gap in the dichroic film.

Figure 4:
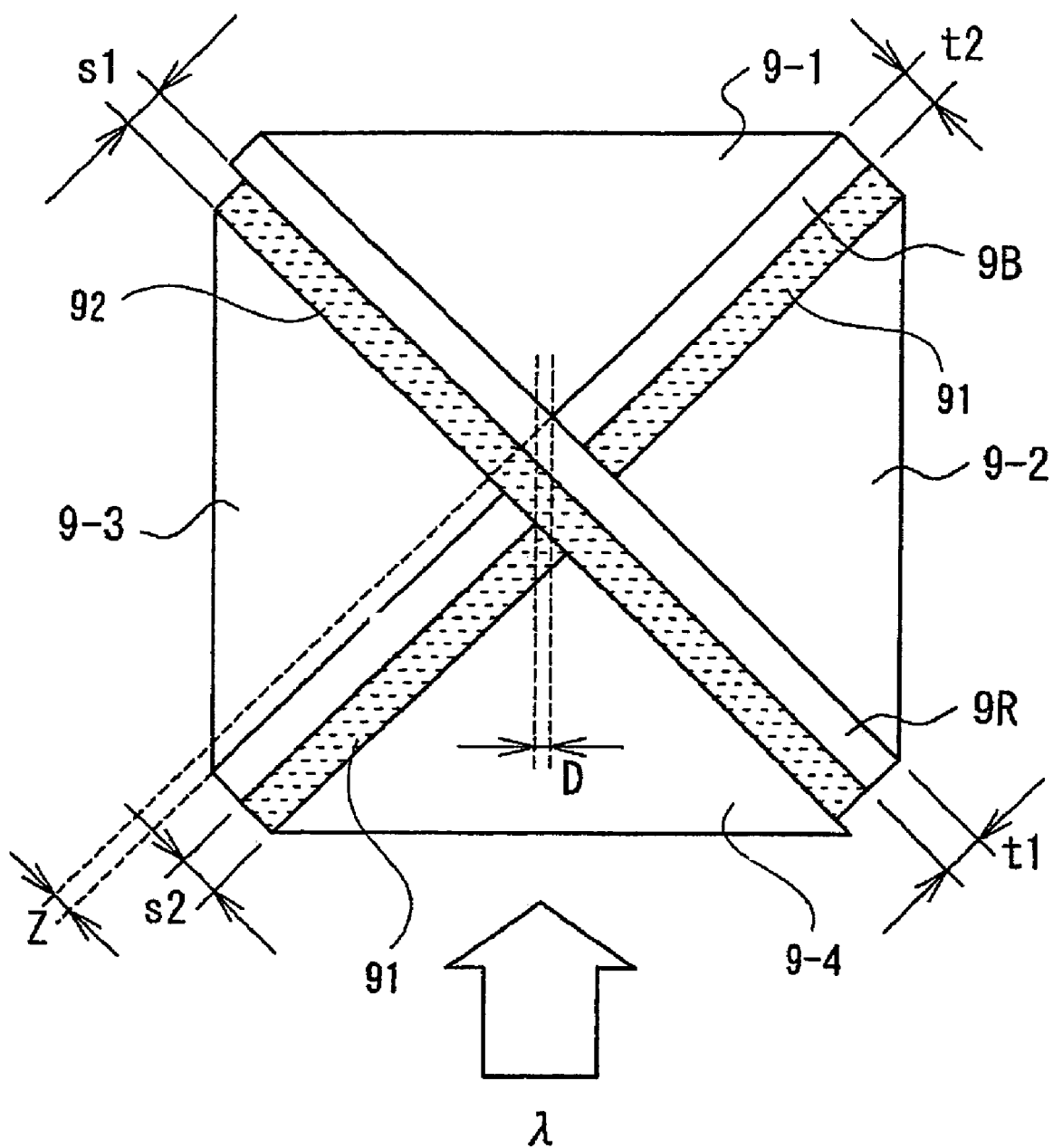
FIG. 4 is a sectional view of a structure adopted in a cross dichroic prism achieved in a second embodiment of the present invention.

FIG. 4 is a sectional view of the structure adopted in the dichroic prism 9 in the second embodiment. In the dichroic prism 9 in FIG. 4, the prism pair made up with the prisms 9-1 and 9-2 and the prism pair made up with the prisms 9-3 and 9-4 each include a B-light reflecting dichroic prism 9B with a layer thickness t2 and an adhesive layer 91 with a layer thickness s2. After forming a continuous R light reflecting dichroic film 9R with a layer thickness t1 at the prism pair made up with the prisms 9-1 and 9-2, the prism pair is bonded with the prism pair made up with the prisms 9-3 and 9-4 via an adhesive layer 92 applied over a layer thickness s1. At this time, the two prism pairs are bonded so as to form a stage Z between the B-light reflecting dichroic film 9B in the prism pair made up with the prisms 9-1 and 9-2 and the B-light reflecting dichroic film 9B in the prism pair made up with the prisms 9-3 and 9-4.

Figure 5:
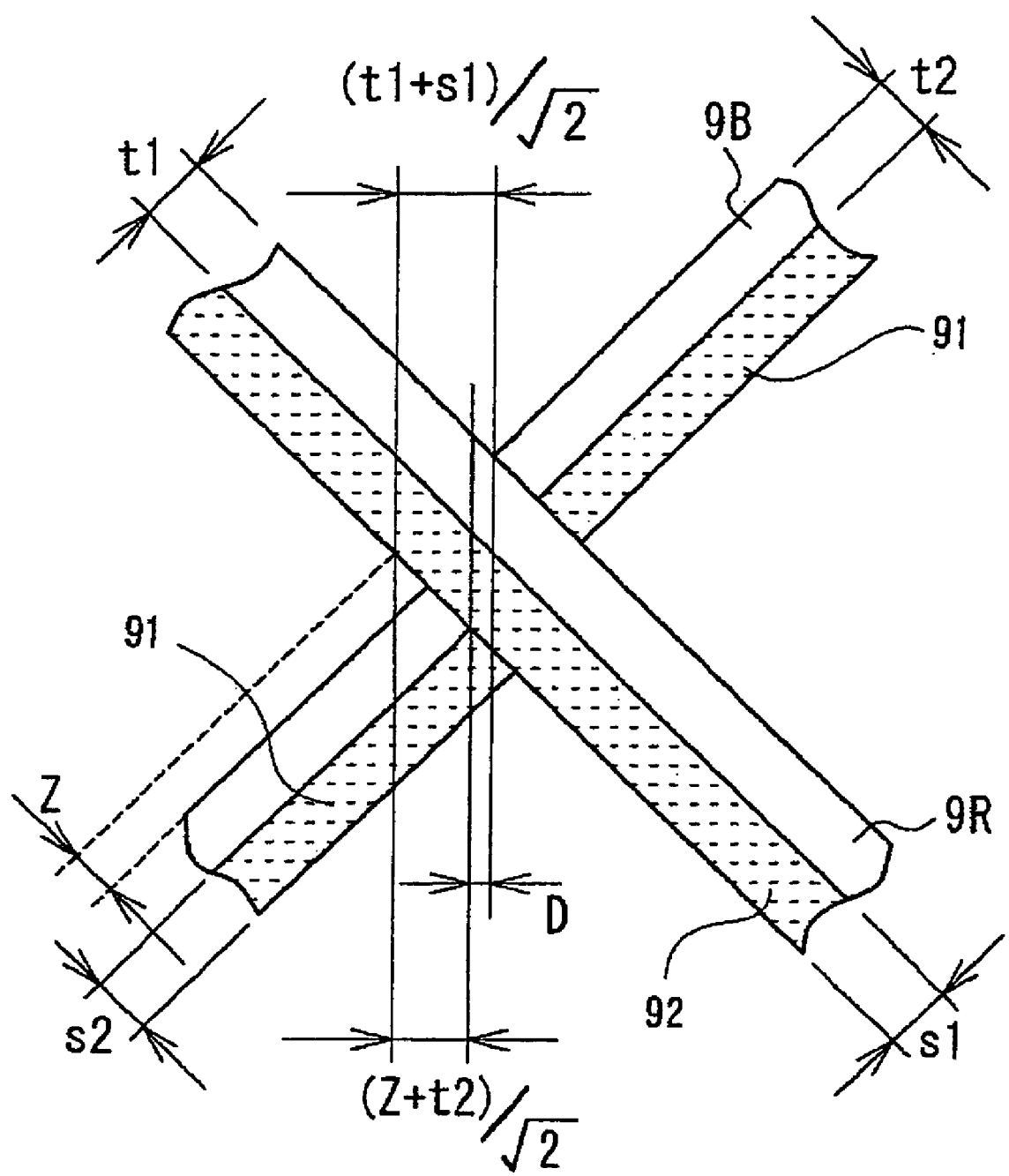
FIG. 5 is an enlarged view showing the structure adopted in the central area of the cross dichroic prism achieved in the second embodiment of the present invention.

FIG. 5 is an enlargement of the central area of the cross dichroic prism 9 shown in FIG. 4. The value of the distance D over which the gap in the B-light reflecting dichroic film 9B ranges at an approximate center can be determined as indicated in (9) below.

$$D=(t1-t2+s1-Z)/\sqrt{2} \qquad (9)$$

Expression (9) can be modified into expression (10)

$$Z=t1-t2+s1-D/\sqrt{2} \qquad (10)$$

It is obvious that D in expressions (9) and (10) must satisfy the relationship expressed in (5) explained earlier.

However, if the depth Z of the stage created at the B-light reflecting dichroic film 9B in the second embodiment is large, double images attributable to the B light reflected at the B-light reflecting dichroic film 9B will appear in the projected image. Namely, since the B-light reflecting dichroic film 9B at which the stage Z is created has B (blue) light reflecting characteristics, and for this reason, the analyzed light from the B light valve 107B, which is reflected at the B-light reflecting dichroic film 9B, forms offset images in the projected image because of the stage Z.

Figure 6:
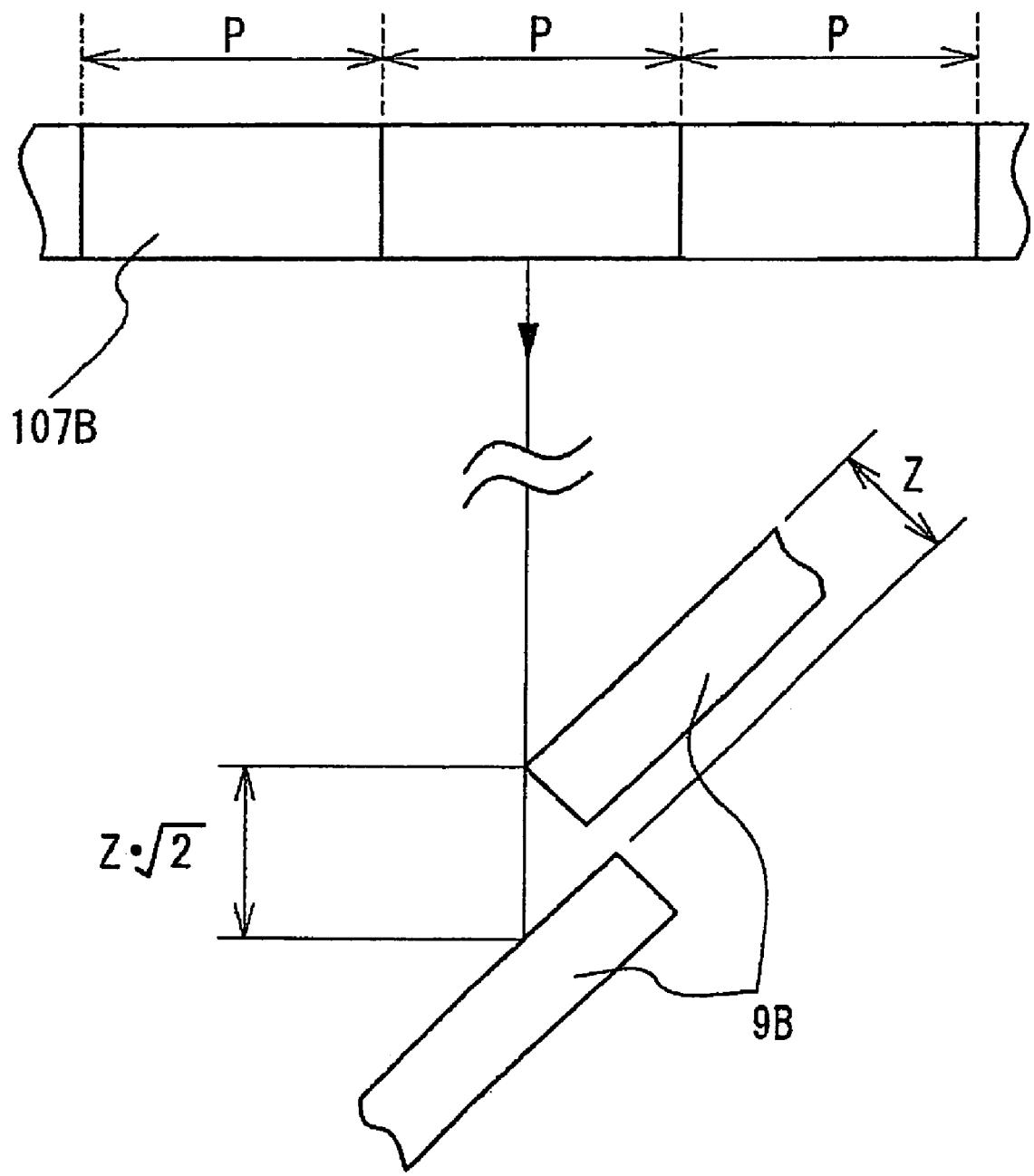
FIG. 6 illustrates how double images attributable to a stage created between dichroic films may manifest in the cross dichroic prism in the second embodiment.

The extent of the offset can be calculated through conversion to be $Z\sqrt{2}$ as indicated in FIG. 6, representing the extent of the offset between the double images on the light valve 107B. P in FIG. 6 indicates the pitch over which the individual pixels are disposed at the light valve 107B. If the extent of the offset $Z\sqrt{2}$ along the vertical direction in the figure is greater than the pixel pitch P at the light valve 107B, double images attributable to the B light, offset by an extent greater than the range of a single pixel, are contained in the projected image, lowering the quality of the projected image. In other words, the offset quantity $Z\sqrt{2}$ must assume a value smaller than the value of the pixel pitch P at the light valve 107B. Namely, $Z\sqrt{2}$ must satisfy the condition expressed in (11) below.

$$Z\sqrt{2}<P \qquad (11)$$

An even more desirable image can be projected if the offset quantity $Z\sqrt{2}$ assumes a value smaller than ½ of the pixel pitch P at the light valve 107B, i.e., if $Z\sqrt{2}$ satisfies the condition expressed in (12) below.

$$Z\sqrt{2}<\tfrac{1}{2}P \qquad (12)$$

In a projection display apparatus equipped with the cross dichroic prism 9 satisfying the requirements described above to function as a color synthesis optical system, diffracted light from the gap in the B-light reflecting dichroic film 9B at the center of the cross dichroic prism 9 is clipped at the aperture stop in the projection lens 110 as it enters the lens and thus, the diffracted light is not projected as a projected image. In addition, by further increasing the angle of diffraction of the diffracted light, even the entry of the diffracted light at the projection lens 110 itself can be disallowed and, in such as case, a highly desirable image can be projected.

THIRD EMBODIMENT

Figure 7:
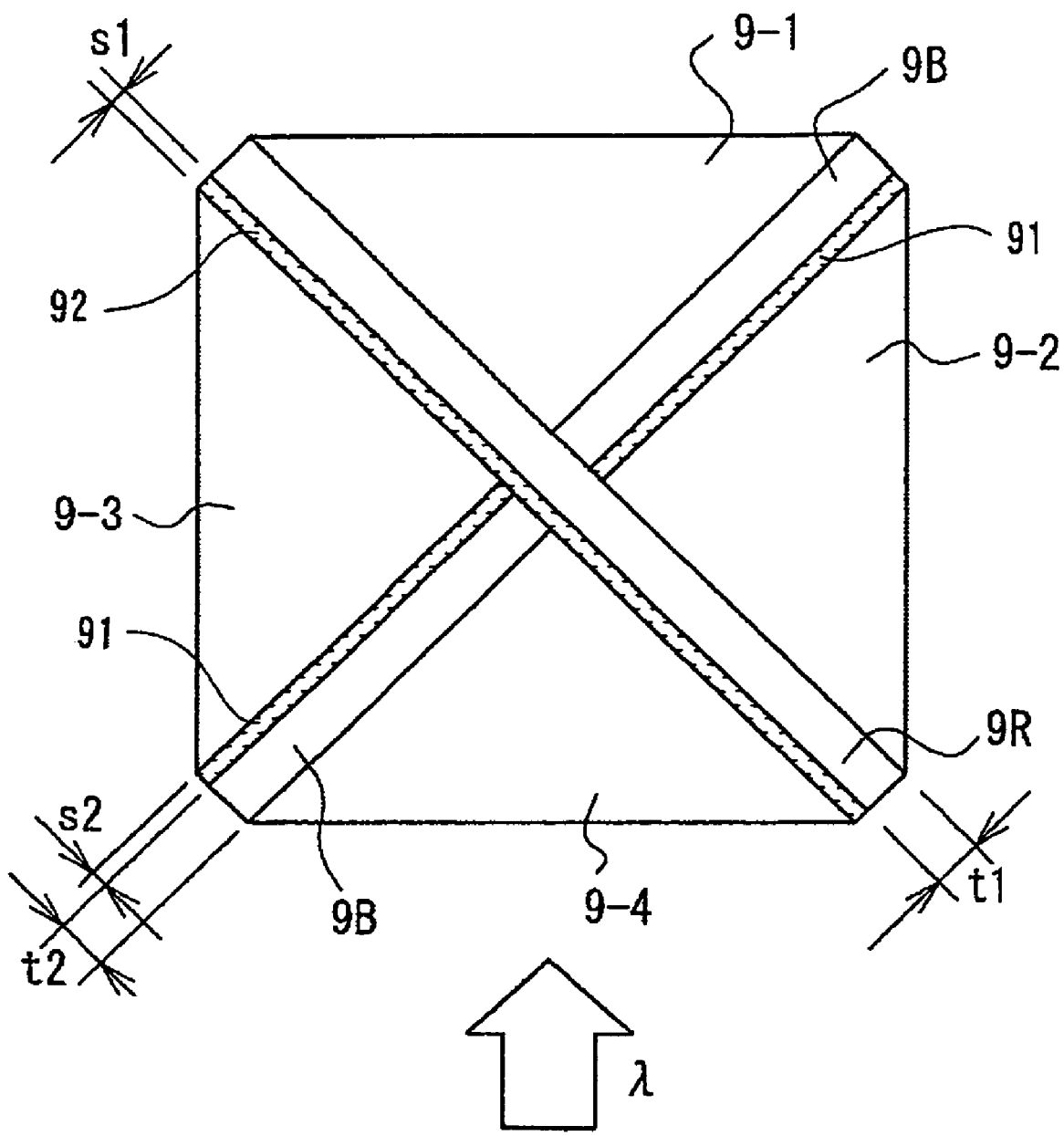
FIG. 7 is a sectional view of a structure adopted in a cross dichroic prism achieved in a third embodiment of the present invention.

FIG. 7 is a sectional view of the structure adopted in the cross dichroic prism 9 in the third embodiment. In the cross dichroic prisms 9 achieved in the first and second embodiments explained earlier, the B-light reflecting dichroic film 9B set discontinuous over a gap at the central area is formed as separate films at the side surfaces of the prism 9-1 and the prism 9-3, as shown in FIGS. 2 and 4.

The B-light reflecting dichroic film 9B in the third embodiment is instead formed at side surfaces of the prism 9-1 and the prism 9-4, at each of these prisms the B-light reflecting dichroic film 9B is formed over a layer thickness t2 at one of the side surfaces forming the right-angle vertex. The prism 9-1 and the prism 9-2 are bonded to each other via an adhesive layer 91 to form a prism pair, and likewise, the prism 9-3 and the prism 9-4 are bonded to each other via an adhesive layer 91 to form a prism pair. Then, an R light reflecting dichroic film 9R with a layer thickness t1 is formed at the prism pair made up with the prisms 9-1 and 9-2, and the other prism pair is bonded onto the surface at which the R light reflecting dichroic film 9R has been formed via an adhesive layer 92 applied over a layer thickness s1, thereby forming the cross dichroic prism 9.

Figure 8:
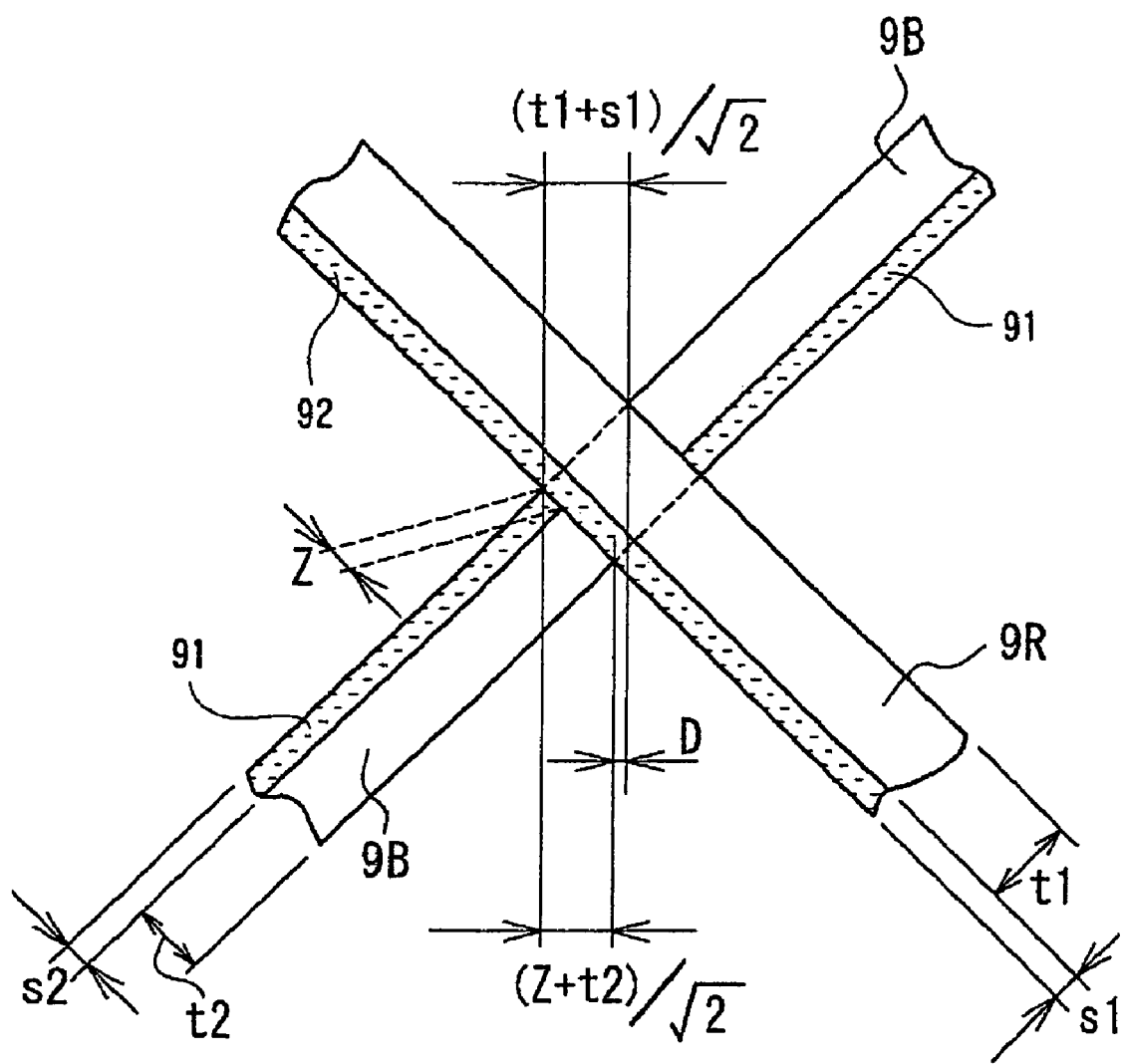
FIG. 8 is an enlarged view showing the structure adopted in the central area of the cross dichroic prism achieved in the third embodiment of the present invention.

FIG. 8 is an enlargement showing the sectional structure adopted at the central area of the cross dichroic prism 9. In the cross dichroic prism 9 achieved in this embodiment, a stage Z, attributable to a thickness s2 of the adhesive layer 91, is formed at the B-light reflecting dichroic film 9B in the central area. The distance D over which the gap in the B-light reflecting dichroic film 9B ranges at the central area can be determined as indicated in (9) explained earlier, as the structure shown in FIG. 8 indicates.

In this structure, the depth of the stage Z is substantially equal to the thickness of the adhesive layer 91 with the layer thickness s2 disposed adjacent to the B-light reflecting dichroic films 9B. Thus, the value of the distance D is determined in correspondence to the value t1–t2 and the value s1–s2 representing the difference between the thicknesses of the adhesive layers 91 and 92. By ensuring that these differences assume specific effective values, the distance D can be made to take on a value substantially equal to 0 or a negative value. However, the issue of the double images attributable to the stage Z needs to be addressed in this structure as well. As described earlier, the depth Z of the stage is substantially equal to the thickness s2 of the adhesive layer 91 and the problem of double images to occur in this structure as in the previous embodiment must be addressed by ensuring that s2 substituted for Z in expression (11) or expression (12) satisfies the condition defined in the expression. Namely, the thickness $s2 \cdot \sqrt{2}$ of the adhesive layer 91 along the vertical direction in the figure must be smaller than the pixel pitch P at the light valve or smaller than ½ of the pixel pitch P. In addition, as expression (9) indicates, if the film thicknesses t1 and t2 of the dichroic films 9R and 9B are substantially equal to each other, the distance D can be set to 0 or less than 0 by setting the thickness s2 of the adhesive layer 91 equal to or greater than the thickness s1 of the adhesive layer 92.

In a projection display apparatus equipped with the cross dichroic prism 9 satisfying the requirements described above to function as a color synthesis optical system, diffracted light from the gap in the B-light reflecting dichroic film 9B at the center of the cross dichroic prism 9 is clipped at the aperture stop in the projection lens 110 as it enters the lens and thus, the diffracted light is not projected as a projected image. In addition, by further increasing the angle of diffraction of the diffracted light, even the entry of the diffracted light at the projection lens 110 itself can be disallowed and, in such as case, a highly desirable image can be projected.

FOURTH EMBODIMENT

Figure 9:
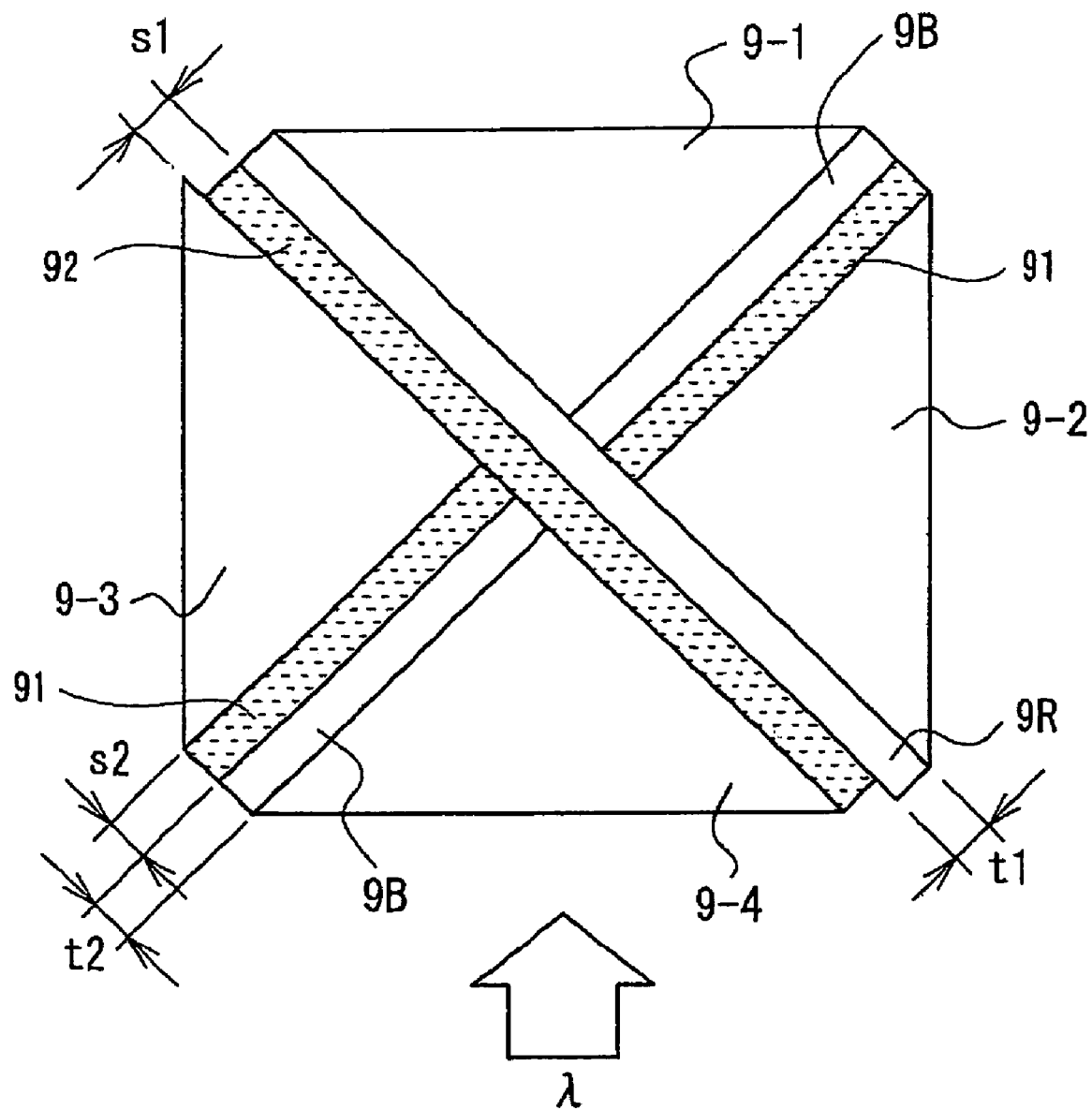
FIG. 9 is a sectional view of a structure adopted in a cross dichroic prism achieved in a fourth embodiment of the present invention.

FIG. 9 is a sectional view showing the structure adopted in the cross dichroic prism 9 in the fourth embodiment. As in the third embodiment, two prism pairs are bonded to each other so as to form a stage between the pair of B-light reflecting dichroic film areas 9B at the cross dichroic prism 9 achieved in the embodiment.

Figure 10:
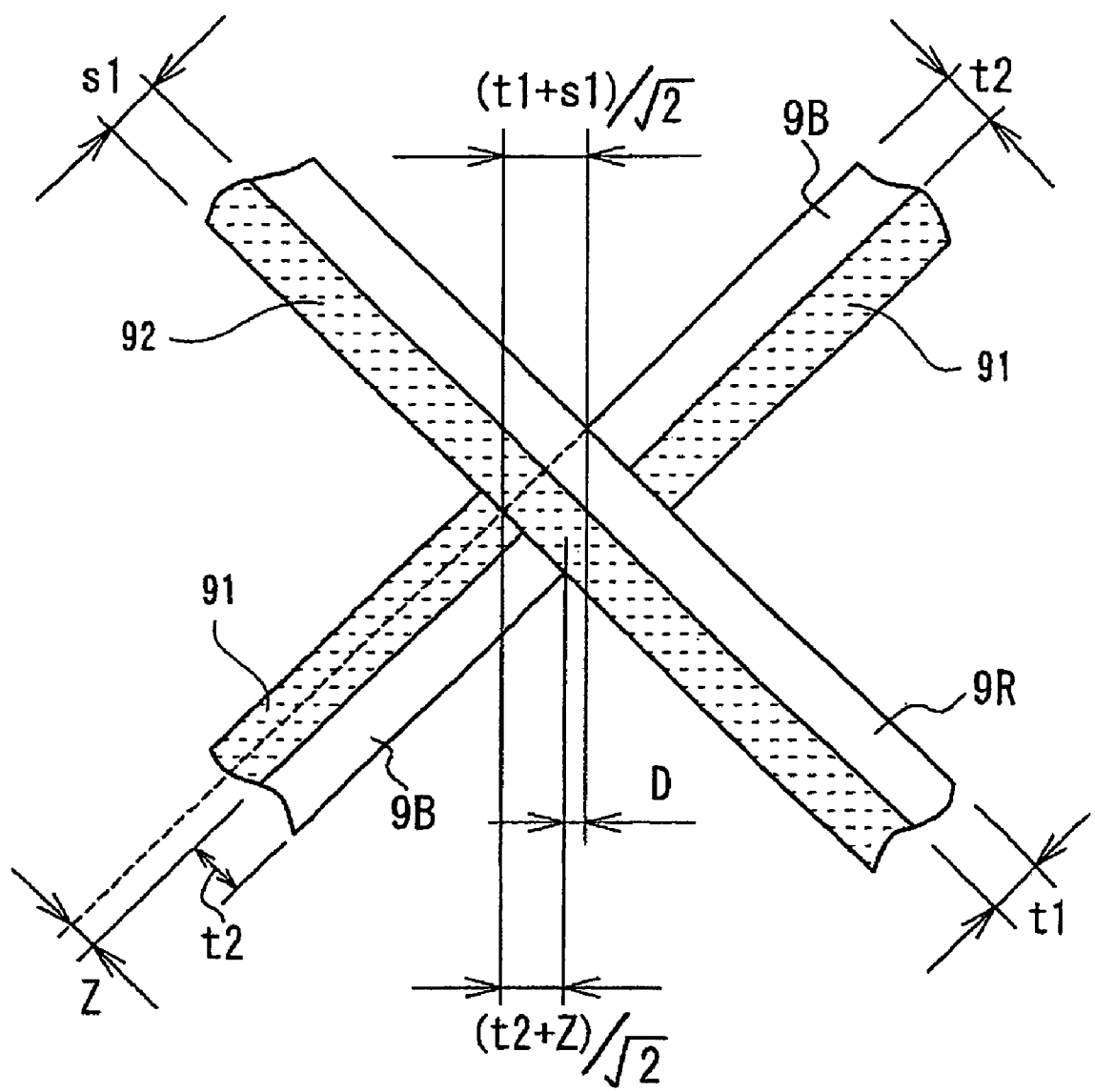
FIG. 10 is an enlarged view showing the structure adopted in the central area of the cross dichroic prism achieved in the fourth embodiment of the present invention.
Figure 11:
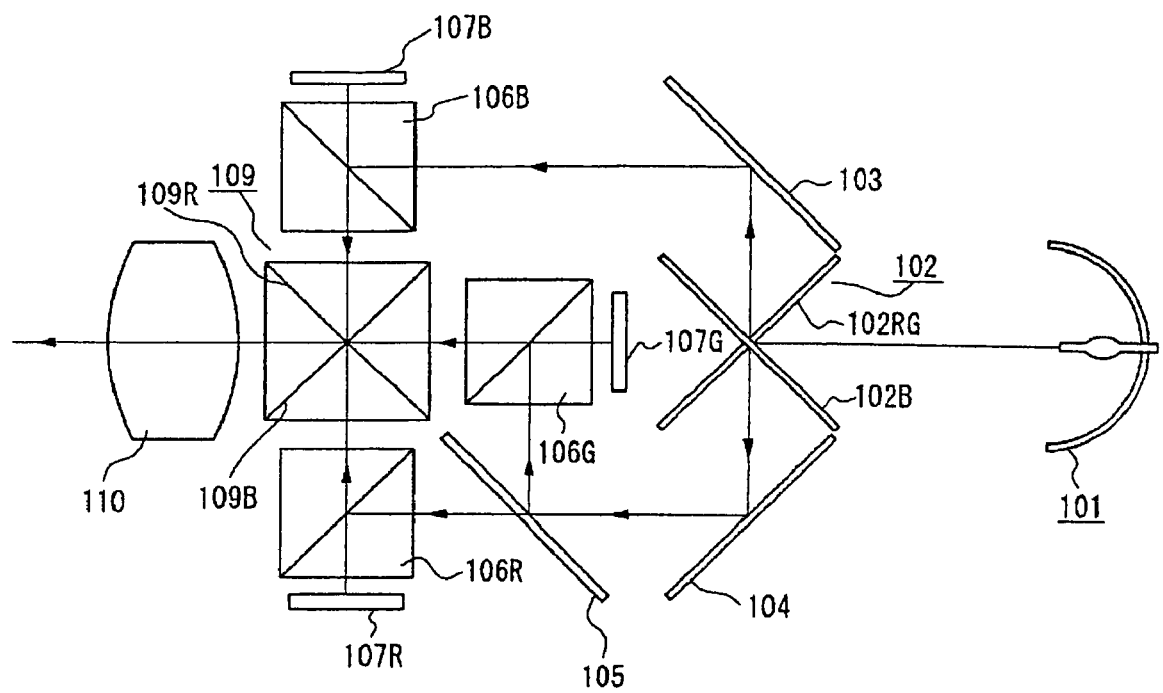
FIG. 11 is a plan view showing the basic structure adopted in a projection display apparatus in the related art.

FIG. 10 is an enlargement showing the sectional structure adopted at the central area of the cross dichroic prism 9. As FIG. 10 indicates, the distance D over which the gap in the B-light reflecting dichroic film 9B ranges at the central area can be determined as indicated in (9) explained earlier, as in the previous embodiment.

In this embodiment, too, the stage Z is formed via the gap between the pair of B-light reflecting dichroic film areas 9B at the central area, as shown in FIG. 10. Accordingly, the depth of the stage Z formed at the B-light reflecting dichroic film 9B must be set so as to satisfy the condition indicated in expression (11) or expression (12), in order to ensure that double images are not projected.

In a projection display apparatus equipped with the cross dichroic prism 9 satisfying the requirements described above to function as a color synthesis optical system, diffracted light from the gap in the B-light reflecting dichroic film 9B at the center of the cross dichroic prism 9 is clipped at the aperture stop in the projection lens 110 as it enters the lens and thus, the diffracted light is not projected as a projected image. In addition, by further increasing the angle of diffraction of the diffracted light, even the entry of the diffracted light at the projection lens 110 itself can be disallowed and, in such a case, a highly desirable image can be projected.

While an explanation is given above in reference to the embodiments on an example in which the dichroic films set discontinuous over the distance D at a substantial center of the cross dichroic prism 9 according to the present invention is a B-light reflecting dichroic film 9B, the present invention is not limited to this example and a gap may be formed in a dichroic film other than the B-light reflecting dichroic film 9B. It is obvious that the present invention may also be adopted equally effectively in a structure that includes a gap formed in an R light reflecting dichroic film 9R over a central area and a B-light reflecting dichroic film 9B formed over a continuous flat surface.

In addition, the cross dichroic prism may adopt a structure in which gaps are formed at the central area in the two types of dichroic films intersecting each other at a right angle, e.g., in an R light reflecting dichroic film and in a B-light reflecting dichroic film. In such a case, each of the gaps formed in the two different types of films should satisfy the conditions explained above with regard to the distance D over which the gap ranges.

While the projection display apparatus described above includes reflective light valves, the cross dichroic prism according to the present invention may be used as a color synthesis optical system in other types of projection display apparatuses. For instance, the present invention may be adopted in a color synthesis optical system of a projection display apparatus in which light is separated to R light, G light and B light at a color separation optical system, transmissive light valves are disposed each in correspondence to a specific color of light and the modulated light beams having undergone modulation at the transmissive light valves are synthesized and projected via a projection lens. Such a projection display apparatus, too, will achieve advantages similar to those explained earlier.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

What is claimed is:

1. A cross dichroic prism that color-synthesizes a plurality of color lights having entered therein separately and emits color-synthesized light to a projection lens, comprising:
   a first dichroic film; and
   a second dichroic film intersecting the first dichroic film so as to pass through the first dichroic film, wherein:
   a width of a gap, created in the first dichroic film over an area where the second dichroic film passes through the first dichroic film, is set such that a color light having entered the cross dichroic prism and having become diffracted at the gap is not to be projected through the projection lens.

2. A cross dichroic prism according to claim 1, wherein:
   with D(μm) representing an apparent distance over which the gap ranges when viewed from a direction of an optical axis of the projection lens, λ(μm) representing a central wavelength of the color light diffracted at the gap and Ø representing an angle that is half an opening angle defined by a numerical aperture NA of the projection lens, the distance D satisfies a relationship expressed in (a) below:

$$(\lambda/D) \times ((\lambda/D)+2) > \sin 4\emptyset \qquad \text{(a)}.$$

3. A cross dichroic prism that color-synthesizes a first color light, a second color light and a third color light having entered therein separately and emits color-synthesized light to a projection lens, comprising:
   a first dichroic film that reflects the first color light and allows the second color light and the third color light to be transmitted; and
   a second dichroic film that intersects the first dichroic film so as to pass through the first dichroic film, reflects the second color light and allows the first color light and the third color light to be transmitted, wherein:
   a width of a gap, created in the first dichroic film over an area where the second dichroic film passes through the first dichroic film, is set such that the third color light diffracted at the gap is not to be projected through the projection lens.

4. A cross dichroic prism according to claim 3, wherein:
   a bonded assembly of first, second, third and fourth right angle triangle prisms having right angle isosceles triangle sections is formed by bonding side surfaces forming right angles so as to abut edges of the side surfaces forming the right angles at the triangle prisms, and
   the first dichroic film and the second dichroic film are formed over an area where the first through fourth right-angle prisms are bonded so that the first dichroic film and the second dichroic film intersect each other over an area where the edges are abutted.

5. A cross dichroic prism according to claim 4, wherein:
   the bonded assembly comprises a first bonded prism, formed by sequentially forming the first dichroic film and a first adhesive layer at one of the side surfaces of the first right-angle prism ranging perpendicular to each other and bonding the second right-angle prism to the side surface of the first right-angle prism and a second bonded prism, formed by sequentially forming the first dichroic film and a first adhesive layer at one of the side surfaces of the third right-angle prism ranging perpendicular to each other and bonding the fourth right-angle prism to the side surface of the third right-angle prism, with the first bonded prism and the second bonded prism bonded to each other so that the first right-angle prism and the third right-angle prism lie adjacent to each other and that the second right-angle prism and the fourth right-angle prism lie adjacent to each other; and the second dichroic film is formed at a surface of the first bonded prism where the first bonded prism is bonded with the second bonded prism and a second adhesive layer is formed for purposes of bonding between the second dichroic film and the second bonded prism.

6. A cross dichroic prism according to claim 5, wherein:

the first bonded prism and the second bonded prism are bonded by ensuring that the first dichroic film formed at the first right-angle prism and the first dichroic film formed at the third right-angle prism form a single flat surface; and with $t2(\mu m)$ representing a film thickness of the first dichroic film, $t1(\mu m)$ representing a film thickness of the second dichroic film, $s1(\mu m)$ representing a thickness of the second adhesive layer, $\lambda(\mu m)$ representing a central wavelength of the third color light diffracted at the gap and $\varnothing$ representing an angle that is half an opening angle defined by a numerical aperture NA of the projection lens, a thickness $(s1+t1)$ is set so as to allow an apparent distance D, over which the gap ranges when viewed from a direction of an optical axis of the projection lens, expressed as $D=(s1+t1-t2)/\sqrt{2}$, to satisfy a relationship expressed in (c) below:

$$(\lambda/D)\times((\lambda/D)+2)>\sin 4\varnothing \qquad (c).$$

7. A cross dichroic prism according to claim 5, wherein:

the first bonded prism and the second bonded prism are bonded to each other so as to create a stage $Z(\mu m)$ between the first dichroic film at the first bonded prism and the first dichroic film at the second bonded prism; and with $t2(\mu m)$ representing a film thickness of the first dichroic film, $t1(\mu m)$ representing a film thickness of the second dichroic film, $s1(\mu m)$ representing a thickness of the second adhesive layer, $\lambda(\mu m)$ representing a central wavelength of the third color light diffracted at the gap and $\varnothing$ representing an angle that is half an opening angle defined by a numerical aperture NA of the projection lens, a thickness $(s1-Z)$ is set so as to allow an apparent distance D, over which the gap ranges when viewed from a direction of an optical axis of the projection lens, expressed as $D=(t1-t2+s1-Z)/\sqrt{2}$, to satisfy a relationship expressed in (d) below:

$$(\lambda/D)\times((\lambda/D)+2)>\sin 4\varnothing \qquad (d).$$

8. A cross dichroic prism according to claim 7, wherein:

the first color light, the second color light and the third color light are emitted from light valves assuming a pixel pitch $P(\mu m)$ and the stage $Z(\mu m)$ satisfies a relationship expressed in (e) below:

$$Z\sqrt{2}<\tfrac{1}{2}P \qquad (e).$$

9. A cross dichroic prism according to claim 4, wherein:

the bonded assembly comprises a first bonded prism formed by sequentially forming the first dichroic film and a first adhesive layer at one of the side surfaces of the first right-angle prism ranging perpendicular to each other and bonding the second right-angle prism to the side surface of the first right-angle prism and a second bonded prism, formed by sequentially forming the first dichroic film and a first adhesive layer at one of the side surfaces of the fourth right-angle prism ranging perpendicular to each other and bonding the third right-angle prism to the side surface of the fourth right-angle prism, with the first bonded prism and the second bonded prism bonded to each other so that the first right-angle prism and the third right-angle prism lie adjacent to each other and that the second right-angle prism and the fourth right-angle prism lie adjacent to each other; and the second dichroic film is formed at a surface of the first bonded prism where the first bonded prism is bonded with the second bonded prism and a second adhesive layer is formed for purposes of bonding between the second dichroic film and the second bonded prism.

10. A cross dichroic prism according to claim 9, wherein:

the first bonded prism and the second bonded prism are bonded to each other so as to create a stage $Z(\mu m)$ between the first dichroic film at the first bonded prism and the first dichroic film at the second bonded prism; and with $t2(\mu tm)$ representing a film thickness of the first dichroic film, $t1(\mu m)$ representing a film thickness of the second dichroic film, $s1(\mu m)$ representing a thickness of the second adhesive layer, $\lambda(\mu m)$ representing a central wavelength of the third color light diffracted at the gap and $\varnothing$ representing an angle that is half an opening angle defined by a numerical aperture NA of the projection lens, a thickness $(s1-Z)$ is set so as to allow an apparent distance D, over which the gap ranges when viewed from a direction of an optical axis of the projection lens, expressed as $D=(t1-t2+s1-Z)/\sqrt{2}$, to satisfy a relationship expressed in (d) below:

$$(\lambda/D)\times((\lambda/D)+2)>\sin 4\varnothing \qquad (d).$$

11. A cross dichroic prism according to claim 10, wherein:

the first color light, the second color light and the third color light are emitted from light valves assuming a pixel pitch $P(\mu m)$ and the stage $Z(\mu m)$ satisfies a relationship expressed in (e) below:

$$Z\sqrt{2}<\tfrac{1}{2}P \qquad (e).$$

12. A cross dichroic prism according to claim 3, wherein:

with $D(\mu m)$ representing an apparent distance over which the gap ranges when viewed from a direction of an optical axis of the projection lens, $\lambda(\mu m)$ representing a central wavelength of the third color light diffracted at the gap and $\varnothing$ representing an angle that is half an opening angle defined by a numerical aperture NA of the projection lens, the distance D satisfies a relationship expressed in (b) below:

$$(\lambda/D)\times((\lambda/D)+2)>\sin 4\varnothing \qquad (b).$$

13. A cross dichroic prism according to claim 3, wherein:

a film thickness of the second dichroic film is smaller than a film thickness of the first dichroic film.

14. A projection display apparatus, comprising:

a color separation optical system that separates light from a light source into a first color light, a second color light and a third color light;

light valves disposed each in correspondence to one of the first color light, the second color light and the third color light;

a cross dichroic prism according to claim 3; and a projection lens that projects light resulting from color synthesis achieved at the cross dichroic prism.

* * * * *